United States Patent [19]

Sogawa

[11] Patent Number: 4,889,095
[45] Date of Patent: Dec. 26, 1989

[54] IGNITION TIMING CONTROL SYSTEM

[75] Inventor: Yoshiyuki Sogawa, Tokyo, Japan

[73] Assignee: Fuji Jukogyo Kabushiki Kaisha, Tokyo, Japan

[21] Appl. No.: 268,983

[22] Filed: Nov. 9, 1988

[30] Foreign Application Priority Data

Nov. 9, 1987 [JP] Japan .................................. 282366
Nov. 11, 1987 [JP] Japan .................................. 285066

[51] Int. Cl.$^4$ .............................................. F02D 5/00
[52] U.S. Cl. ..................................... 123/418; 123/416
[58] Field of Search ............... 123/418, 416, 417, 480, 123/643, 422, 425

[56] References Cited

U.S. PATENT DOCUMENTS

| 4,562,812 | 1/1986 | Chauval | 123/418 |
| 4,649,881 | 3/1987 | Long | 123/418 |
| 4,747,383 | 5/1988 | Kimura et al. | 123/422 |
| 4,790,279 | 12/1988 | Tobinaga et al. | 123/417 |

Primary Examiner—Raymond A. Nelli
Attorney, Agent, or Firm—Beveridge, DeGrandi & Weilacher

[57] ABSTRACT

An ignition timing control system of time interval control type of an engine having a cam angle sensor for detecting a specific cam angle and for generating a cam angle signal, a crank angle sensor for detecting a plurality of specific crank angles and for generating a crank angle signal and an electronic control unit responsive to the cam angle and crank angle signals for controlling an ignition timing.

2 Claims, 5 Drawing Sheets

IGNITION TIMING CONTROL SYSTEM

BACKGROUND OF THE INVENTION

This invention relates generally to an engine for a motor vehicle and more particularly to a system for controlling an ignition timing of the engine. More specifically, the invention relates to an ignition timing control system of a time-control type which sets the ignition timing in accordance with a time interval from a crank angle reference signal or from a reference crank angle position.

Heretofore, among ignition timing control systems of the time-control type, there has been a system which utilizes signals of crank angles of even pitch, and in which, in order to improve the reference position detection accuracy, the ignition timing is corrected on the basis of the difference between a value derived by averaging processing of an engine rotational speed and the engine rotational speed thereby to determine an appropriate ignition advance angle as indicated, for example, in Japanese Patent Laid-Open Publication No. 6071/1985 (corresponding to U.S. Pat. No. 4,498,438), and thereby to reduce a car knocking (bucking or hiccupping motion) of the vehicle due to misfiring.

Furthermore, as disclosed in Japanese Patent Laid-Open Publication No. 32974/1985, there has been a system in which, by computing the ignition timing through the use of engine rotational speed data, which has been averaged, when a specific time has elapsed after starting of the engine and the engine speed is at a specific value or higher than the specific value, excessively advancing of the ignition angle occurring in accordance with increasing of the engine speed is prevented, and deviation in the ignition timing at high speed is reduced.

Another problem which is not solved in the systems of the above cited references is that the crank angular velocity varies even during one cycle of combustion because of the generation of torque due to combustion and absorption of torque due to compression, this crank angular velocity variation being large particularly under conditions such as those at the time of starting by cranking, and, by method of detecting the crank angular velocity as described in the above mentioned references, there is the possibility of a difference occurring between the set advance angle value and an actual ignition timing.

Ordinarily, the ignition timing in terms of the crank angle, is stored beforehand in a map stored in a microcomputer as a value determined by the engine operational conditions such as an engine speed and an intake air flow rate. In the case where the ignition timing is controlled by the time interval from a datum reference crank angle position signal, the time interval from the reference crank angle position to the ignition timing is calculated from the value of the angle derived from the above mentioned map and the crank angular velocity at the time, and, on the basis of this time interval, ignition timing control is carried out. Ignition timing control according to a time interval control method of this character can be carried out continuously with an extremely high resolution in the normal state.

In the case of ignition timing control depending on the time interval from the reference crank angle signal detected, it is necessary to convert crank angle into time interval. For this purpose, the rotational speed of the crank, that is, the engine speed, must be detected. Then, in terms of the ignition timing which has been set (ignition advance angle BTDC) $A_{ADV}$, the engine rotational speed N, the reference crank angle $A_{REF}'$ and a proportional constant $\alpha$, the time interval $T_{ADV}$ from the reference crank angle signal detected to the ignition is expressed as follows.

$$T_{ADV} = \alpha \times 1/N \times (A_{REF} - A_{ADV})$$

In order to calculate this engine rotational speed N, it is necessary to measure the time interval $T_{REF}$ between a reference crank angle detected $A_{REF}$ and reference crank angle detected $B_{REF}$ adjacently provided at the advancing side in the ignition timing of the angle $A_{REF}$. However the crank angular velocity varies, even during one cycle, because of increase of torque due to combustion and decrease of torque due to compression, whereby the value of the engine rotational speed N changes depending on the angular position at which the time interval $T_{REF}$ between the reference crank angles is measured.

Consequently, if the time interval $T_{REF}$ is measured at a position where the crank angular velocity is high within one cycle of combustion, the ignition position $A_{ADV}$ tend to be offset in the advance direction, whereas if the time interval $T_{REF}$ is measured at a position where the crank angular velocity is low within one cycle of combustion, the ignition position $A_{ADV}$ tends to be offset in the retardation direction. This tendency is pronounced particularly in the low-speed region. Furthermore, if this measurement is carried out before one cycle of combustion, a delay in the response of the engine speed N with respect to the ignition timing $T_{ADV}$ occurs at the engine rotation in a transient state. As a consequence, at the transient operation such as that in the low-speed rotation as at the starting of the engine or of the vehicle, ignition timing cannot be controlled accurately and positively.

SUMMARY OF THE INVENTION

An object of this invention, which seeks to solve the above described problems, is to provide a system for controlling an ignition timing of an engine for a motor vehicle which system is capable of carrying out ignition timing control of the time interval control method with high accuracy even in the low-speed region of operation or at the transitional or transient operation.

According to this invention, in one aspect thereof, there is provided an ignition timing control system of time interval control type of an engine for a motor vehicle having a cam angle sensor for detecting a specific cam angle and for generating a cam angle signal, a crank angle sensor for detecting a plurality of specific crank angles and for generating a crank angle signal, and an electronic control unit responsive to the cam angle signal and the crank angle signal for controlling an ignition timing, which system operates to calculate a basic fuel injection quantity on the basis of engine operational conditions such as an engine speed and a throttle opening degree, to determine, in accordance with said basic fuel injection quantity and the engine speed, an ignition angle from a first reference crank angle position detected by said crank angle sensor to an ignition angular position, and to convert said ignition angle into a time interval from said first reference crank angle position detected to ignition angular position by a crank angular velocity calculated by the rotational time between the first reference crank angle position and a second reference crank angle position, adjacently provided at an advancing side in the ignition timing of the first reference crank position thereby to set the ignition timing, the improvement wherein said first and second reference crank angle positions for setting said ignition timing is selected that the average crank angular velocity calculated from the rotational time between said first and second reference crank angle positions coincides with the average crank angular velocity.

According to this invention, in another aspect thereof, there is provided an ignition timing control system of a time interval control type of an engine for a motor vehicle having a cam angle sensor for detecting a specific cam angle and for generating a cam angle signal, a crank angle sensor for detecting a plurality of specific crank angles and for generating a crank angle signal, and an electronic control unit responsive to the cam angle signal and the crank angle signal for controlling an ignition timing, the system operates to calculate a basic fuel injection quantity corresponding to an engine load, to determine an ignition angle from a reference crank angle position detected by said crank angle sensor to an ignition angular position in accordance with said basic fuel injection quantity and an engine speed, and to convert said ignition angle into a time interval from a reference crank angle position detected to ignition angular position detected thereby to set the ignition timing, and which is characterized in that it is provided with basic fuel injection quantity calculating means responsive to the engine speed signal and the throttle position signal for calculating a basic fuel injection quantity, ignition angle setting means responsive to the engine speed signal and an output signal of the basic fuel injection quantity calculating means for setting an ignition angle from a position detected to the first reference crank angle to an ignition position and for generating an ignition angle signal ignition timing calculating means responsive to the ignition angle signal and the crank angular velocity signal for calculating an ignition timing converted from the ignition angle and the average crank angular velocity and for generating an ignition timing signal, timer means responsive to an output signal of the ignition timing correcting means for operating the fuel injector, add setting means for setting the first reference crank angle and the second reference crank angle to coincide with the average crank angular velocity and an average crank angular velocity from the position detected to the first reference crank angle to the ignition position thereby to control with high precision to a set ignition advance value even at a time of transient operational state of the engine.

On the basis of the above described ignition timing control system of this invention in the first aspect thereof, the ignition timing is controlled with the time interval $T_{ADV}$ from an appropriate reference crank angle position. The crank angular velocity for calculating this time interval $T_{ADV}$ is detected from the time interval $T_{REF}$ required for rotation between two reference crank angle positions within the same cycle of combustion. This reference crank angle position is selected that the average crank angular velocity during the time interval $T_{ADV}$ coincides substantially with the average crank angular velocity during the time interval $T_{REF}$ thereby to control the ignition timing with high accuracy.

On the basis of the above described the system of this invention in the second aspect thereof, the ignition timing is controlled to an ignition advance angle value set by the engine operational conditions. In this system, the ignition timing is controlled with a time interval $T_{ADV}$ from an appropriate reference crank angle position. The crank angular velocity for calculating this time interval $T_{ADV}$ is detected from the time interval $T_{REF}$ elapsed between two reference crank angle positions within one cycle of combustion. The discrepant difference between the set ignition timing and the actual ignition timing which arises from the variation of the crank angular velocity within one cycle of combustion, the set ignition timing is corrected by a correction time interval which has been previously set for each engine operational condition, whereby ignition timing control of high accuracy is carried out.

The nature, utility, and further features of this invention will be more clearly apparent from the following detailed description with respect to preferred embodiments of the invention when read in conjunction with the accompanying drawings, briefly described below.

DETAILED DESCRIPTION OF THE PREFERRED EMBODIMENTS

Figure 1:
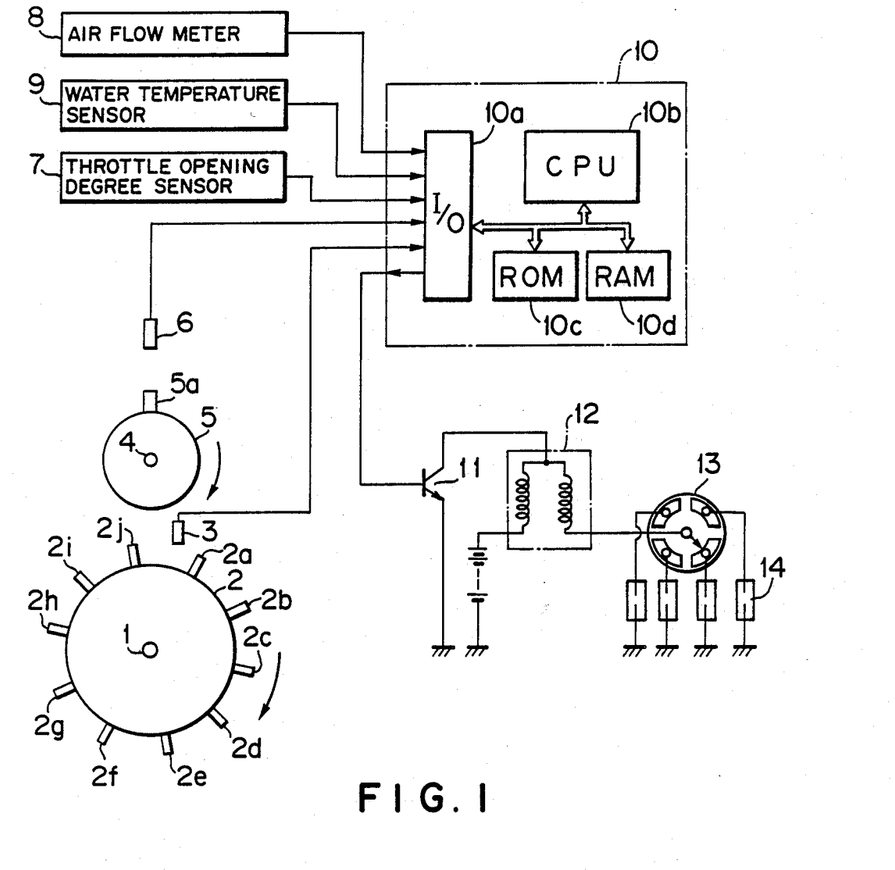
FIG. 1 is a combination of a schematic mechanical diagram, a block diagram for the control system, and an electrical circuit diagram showing one embodiment of an engine ignition timing control system according to this invention.

Referring first to FIG. 1, a disk-shape crank plate 2 for detection of the crank angular position is fixed coaxially to a crankshaft 1 of an engine. The crank plate 2 provides a plurality of projections 2a to 2j in circumferential and equally provided each other thereon, to detect specific crank angle positions by a crank angle sensor 3 adjacently disposed with the projections, and the crank angle sensor 3 generates a crank angle signal corresponding to said each projection 2a to 2j. Instead of the projections 2a to 2j, corresponding slits may be used.

A camshaft 4, which rotates through one revolution for two revolutions of the crankshaft 1, is also provided with a disk-shape cam plate 5 fixed coaxially thereto. This cam plate 5 is provided with a single detectable projection 5a fixed to the circumferential surface thereof at a specific cam angle position, for example, at a specific crank angle position before TDC (top dead center) of cylinder number 1, which is the reference cylinder. A cam angle sensor 6 is so positioned as to confront the outer periphery of the cam plate 5 to detect the passing of the projection 5a and, in response thereto, generate a cam pulse signal. A throttle position sensor 7 provides to detect an opening degree of a throttle valve of the engine and to produce a throttle signal corresponding to the opening degree. Furthermore, reference numeral 8 indicates an air flow meter and reference numeral 9 indicates a water temperature sensor for detecting an engine cooling water temperature.

A control unit 10 comprises, microcomputers and other components. The control unit 10 operates to calculate an ignition timing responsive to the crank angle signal and the cam angle signal and to calculate a basic fuel injection quantity responsive to the crank angle signal, cam angle signal and the throttle signal.

Figure 4:
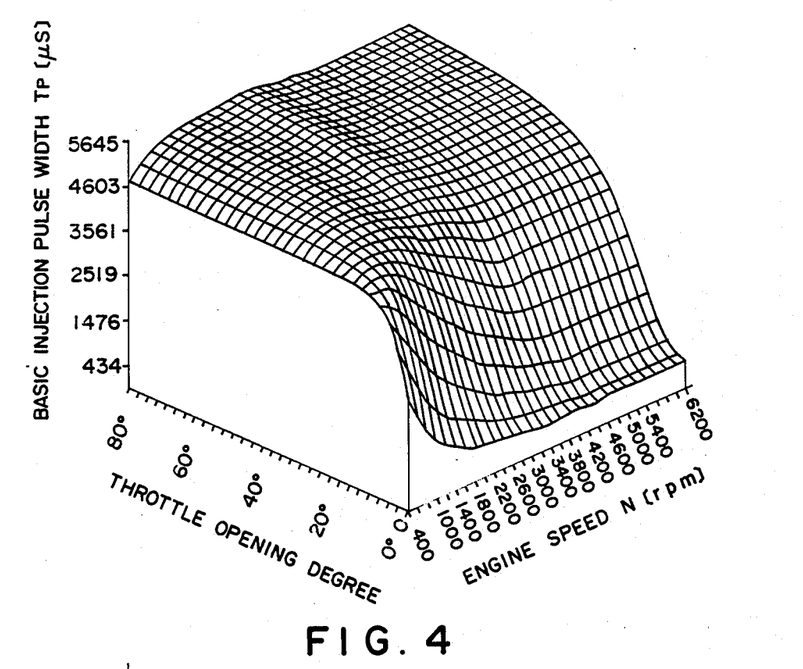
FIG. 4 is a perspective graph indicating a basic fuel injection quantity map.

This control unit 10, as shown in FIG. 1, comprises an input/output interface 10a, a CPU (central processing unit) 10b, a ROM (Read-Only Memory) 10c in which is stored a control program or various maps such as, for example, a basic fuel injection quantity map as indicated in FIG. 4, or a firing angle map, a RAM (Random-Access Memory) 10d for storing data, and other components. The control unit 10 operates according to a prescribed program to calculate compute an ignition timing from the crank pulse signal related to the reference crank pulses and, at each ignition timing transmits an ignition signal to an actuating circuit 11 comprising a component such as a power transistor thereby to turn the actuating circuit 11 from ON to OFF, whereby ignition energy is transmitted by way of an ignition coil 12, and a distributor 13 to the spark plug 14 of the pertinent cylinder.

Next, the system of ignition timing control according to the present invention will be described with reference to FIG. 2 indicating the functional apparatus of the control unit 10. The pulse signals outputted respectively by the crank angle sensor 3 and cam angle sensor 6 are fed as input into a calculating means 20 for calculating crank reference angle interval time, which thereupon operates to identify the cylinder (number) to be injected in response to the pulse signal generated by the detection of the projection 5a and at the same time to calculate the time elapsed between two adjacent crank angle positions which are indicated by crank angle pulse signals among those successively received as input after the cam angle pulse generated by detection of the projection 5a has been detected, and which moreover are in the retardation direction, that is, rotational upstream side, from the injecting position in the case of maximum advance angle. For example, as indicated in FIG. 3, in the case of cylinder number 3, the pulses of the crank angle signal generated by detection of the projections 2c and 2d are designated respectively as reference crank angle positions $B_{REF}$ and $A_{REF}$, and the calculating means 20 calculates the time $T_{REF}$ elapsed between these two positions.

This time $T_{REF}$ is transmitted as output to an engine speed calculating means 21, which thereupon calculates the engine speed N and transmits this as output to a basic fuel injection quantity setting means 22 and an ignition angle setting means 23.

The basic fuel injection quantity setting means 22 determines the basic fuel injection quantity (injection pulse width) $T_P$ by referring to a map as shown in FIG. 4 on the basis of the engine speed N and the opening degree $\theta$ of the throttle detected from the throttle opening degree sensor 7 and then actuates injectors 15. This quantity $T_P$ is transmitted to injectors 15 and to the ignition angle setting means 23, which also receives as input the engine speed N information and the throttle opening signal from the throttle opening degree sensor 7 and, with reference to a basic ignition angle map 24, sets the ignition angle $ANG_{SPK}$, that is, the crank angle from the reference crank angle position $A_{REF}$ (corresponding to projection 2d) to the No. 3 ignition position $A_{ADV}$. This ignition angle $ANG_{SPK}$ is transmitted to an ignition timing calculating means 25, where the time from the reference crank angle position $A_{REF}$ to the ignition position $A_{ADV}$, that is, ignition timing $T_{ADV}$, from the crank reference angular interval time $T_{REF}$ (the angle between the projections 2c and 2d in this case is 36 degrees) is determined from the following equation.

$$T_{ADV}=(ANG_{SPK}/36°)\cdot T_{REF}$$

The ignition timing $T_{ADV}$ thus calculated is set in a timer means 26. When the timer time interval from the reference crank angle position $A_{REF}$ reaches the ignition timing $T_{ADV}$ thus set, an ignition signal is transmitted to the aforedescribed actuating circuit 11, and ignition energy is transmitted to the spark plug 14 of the No. 3 cylinder.

However, even during one cycle of combustion of the engine, the crank angular velocity varies periodically as indicated in FIG. 3. Therefore, if the procedure of merely determining the angular velocity with the time $T_{REF}$ and, on the basis of this, calculating the ignition timing $T_{ADV}$ is carried out, a lag or discrepancy, will occur between the ignition angle $ANG_{SPK}$ which has been set and the crank angle position at which ignition actually takes place. This lag will become large particularly at the time of slowspeed operation such as the time of starting or idling of the engine.

Accordingly, within one and the same cycle of combustion, reference crank angle positions $A_{REF}$ (projections 2d and 2i) and $B_{REF}$ (projections 2c and 2h) are set or selected, and is maintained according to the ignition timing $T_{ADV}$ from the reference position $A_{REF}$ so that the average crank angular velocity speed between the two reference positions $B_{REF}$ and $A_{REF}$ for the purpose of measuring the time $T_{REF}$ and average crank angular velocity between the ignition reference position $A_{REF}$ and the ignition position $A_{ADV}$, that is, during the ignition angle $ANG_{SPK}$ will coincide. By this measure, since the measured data with the same cycle of combustion are used, the effect of fluctuation on the ignition timing will be very slight even when the engine speed is in a transient state. Furthermore, in the low-speed region during normal operation, also, variations in the crank angular velocity have little effect, and the ignition timing can be controlled with high precision to the set advance value.

In another embodiment of this invention, the general apparatus of the ignition timing control system is essentially the same as that of the preceding embodiment of the invention as shown in FIG. 1.

Figure 2:
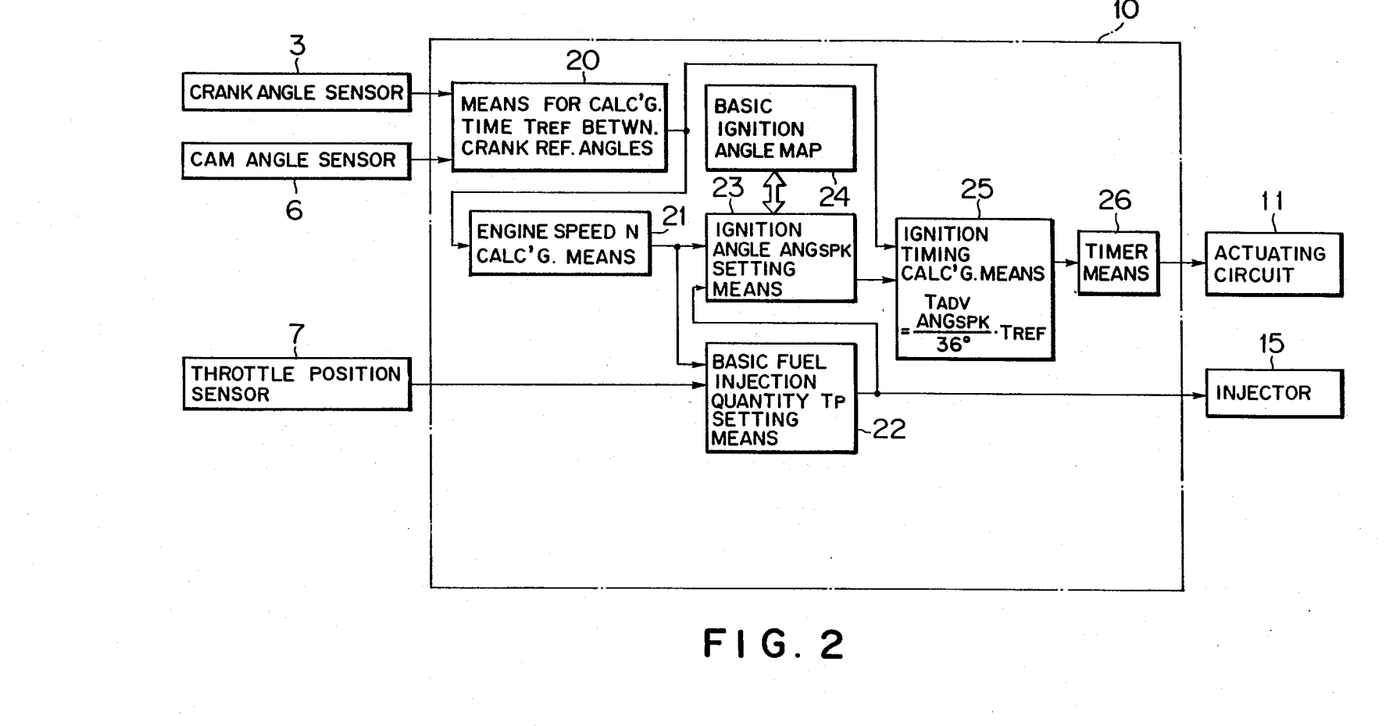
FIG. 2 is a block diagram showing the embodiment of the control system according to FIG. 1.
Figure 3:
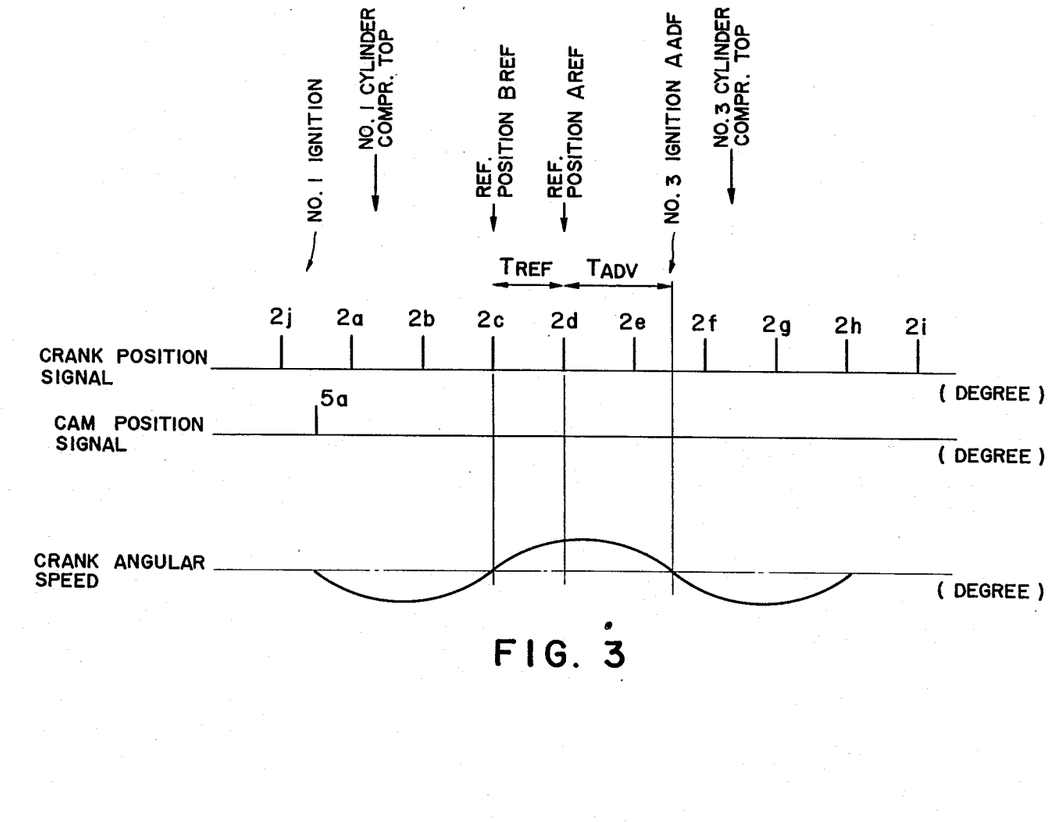
FIG. 3 is a time chart showing detection positions of the crank angle and cam angle and indicating relationships thereof to various ignition control operations.
Figure 5:
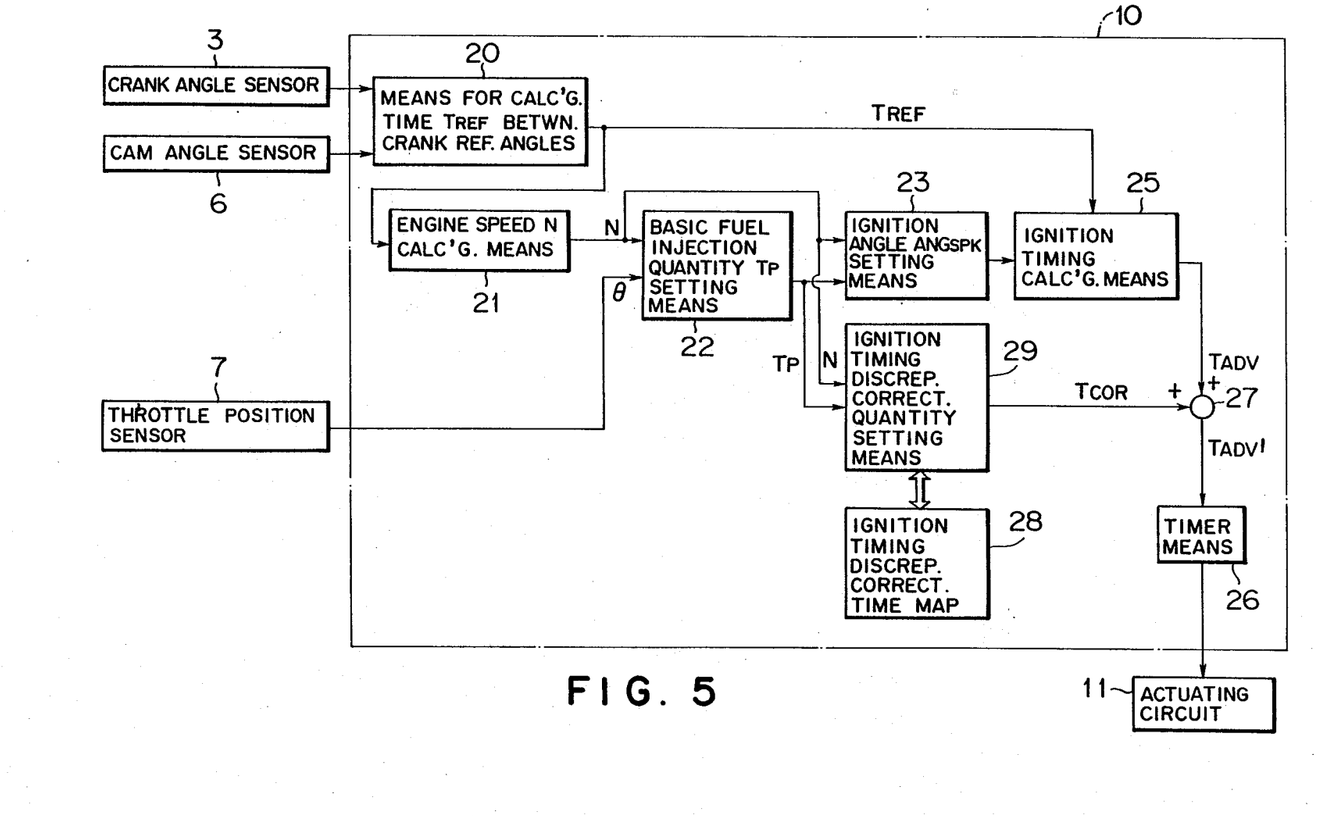
FIG. 5 is a block diagram similar to FIG. 2 of another embodiment of the electronic control unit.

The functional apparatus of the control unit 10 of this second example is indicated in FIG. 5, in which those components which are the same as or equivalent to corresponding components in FIG. 2 are designated by like reference numerals. A major feature of difference in this second example is the provision therein of an ignition timing discrepancy correction quantity setting means 29, into which are fed the outputs of the engine speed calculating means 21 (N) and the basic fuel injection quantity setting means 22 ($T_P$). An output ($\theta$) of the throttle opening degree sensor 7 is transmitted to the basic fuel injection quantity setting means 22, which operates in accordance with this output $\theta$ and the engine speed N to determine by reference to a map of the basic fuel injection quantity (injection pulse width) $T_P$.

Another difference in this system is the provision of an ignition timing discrepancy correction time map 28 to be referred to the operation of the above described ignition timing discrepancy correction quantity setting means 29, which transmits as output an ignition timing discrepancy correction time $T_{COR}$ to an ignition timing correcting means 27.

Similarly as in the preceding example, the ignition timing calculating means 25 determines the time interval from the reference crank angle pulse generated by the projection 2d, that is, the ignition timing $T_{ADV}$, from the ignition angle $ANG_{SPK}$ and the crank reference angular interval time $T_{REF}$ (the angle between the crank angle pulses corresponding to projections 2c and 2d being 36 degrees) according to the following equation.

$$T_{ADV} = (ANG_{SPK}/36°) \cdot T_{REF}$$

The ignition timing $T_{ADV}$ thus calculated is transmitted through the ignition timing correcting means 27 and the timer means 26. When the timer time from the reference crank angle pulse generated by the projection 2d reaches the ignition timing $T_{ADV}$ thus set, an ignition signal is transmitted to the actuating circuit 11, and ignition energy is applied to the spark plug 14 of No. 3 cylinder.

The aforedescribed problem of the occurrence of discrepancy between the set ignition angle $ANG_{SPK}$ and the actually ignition crank angle position particularly at the time of low-speed and high-load operation of the engine is solved by this control system in the following manner.

In the aforementioned ROM 10c of the control unit 10 is stored an ignition timing discrepancy correction time map 28 which has been experimentally determined beforehand for each operational condition. With reference to this map 28, the aforedescribed setting means 29 for setting the ignition timing discrepancy correction quantity operates on the basis of the engine speed N and the basic fuel injection quantity $T_P$ expressed as a load to determine an ignition timing discrepancy correction time $T_{COR}$ in accordance with the operational conditions and transmits this correction time $T_{COR}$ to the aforementioned ignition timing correcting means 27. In this correcting means 27, the ignition timing $T_{ADV}$ from the ignition timing calculating means 25 is added to accomplish correction. The ignition timing $T_{ADV}$ thus corrected is then set in the timer means 26.

Figure 6:
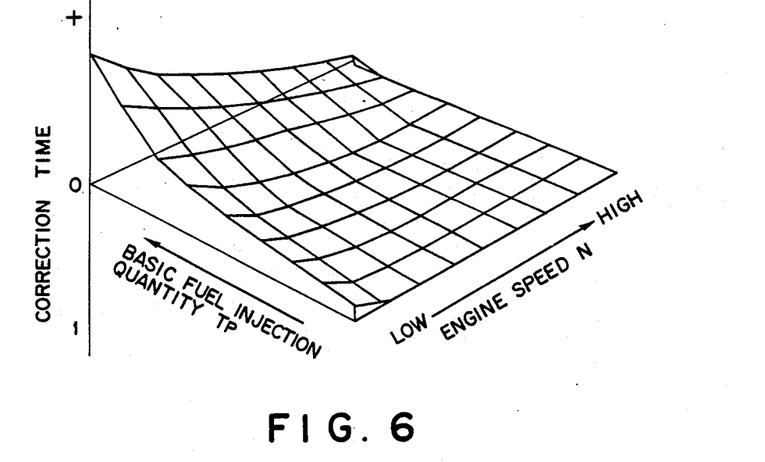
FIG. 6 is a perspective graph indicating an ignition timing discrepancy correction time map.

The ignition timing discrepancy correction time map 28 in the case where the basic crank angle position is shown in FIG. 6. By the use of such a correction time map 28, the crank angular velocity obtained from the crank reference angular interval time $T_{REF}$ can be controlled with high resolution and moreover with high precision since the crank angular velocity which varies during the ignition timing $T_{ADV}$ can be estimated and be corrected according to the operational conditions.

While, in this second example, the basic fuel injection quantity is set in accordance with the throttle opening degree and the engine speed, this invention is not intended to be thus limited, it being possible to use, instead of the throttle opening degree, another operational condition such as the flow rate of the engine intake air or the negative pressure within the intake pipe.

As described hereinbefore with respect to the first example thereof, this invention in the first aspect thereof provides an engine ignition timing control system in which reference crank angle positions for setting ignition timing are set within one and the same cycle of combustion so that the average crank angular velocity of two reference crank angle positions for time measurement and the average crank angular velocity of the reference crank angle position for ignition and the ignition position will coincide. Therefore, normally, the ignition timing can be controlled with high precision to a set ignition advance value even at the time of transient operational state of the engine such as operation in the low-speed region or during the start of driving.

In the second aspect thereof, this invention as described above provides an ignition timing control system in which the discrepant difference between the set ignition timing and the actual ignition timing is corrected by an ignition timing discrepancy correction time which is set beforehand in the form of a map for each operational condition. Therefore, ignition timing control can be carried out with high precision even at the time of transient operation such as that in the low-speed region or that at rapid starting of driving in which, within one cycle of combustion, the crank angular velocity undergoes relatively large fluctuations.

What is claimed is:

1. An ignition timing control system for an internal combustion engine with at least one fuel injector, having a cam angle sensor for detecting a specific cam angle and for generating a cam angle signal, a crank angle sensor for detecting a first reference crank angle and a second reference crank angle provided at an advancing side of an ignition timing of the first reference crank angle and for generating crank angle signals corresponding to the first and second reference crank angles, a throttle position sensor for detecting an opening degree of a throttle valve of the engine and for generating a throttle position signal corresponding to the opening degree of the throttle valve, crank angular velocity calculating means responsive to the crank angle and cam angle signals for calculating an average crank angular velocity between the first and second reference crank angles and for generating a crank angular velocity signal, and engine speed calculating means responsive to the crank angular velocity signal for calculating an engine speed and for generating an engine speed signal, and said system comprises:

basic fuel injection quantity calculating means responsive to the engine speed signal and the throttle position signal for calculating a basic fuel injection quantity, ignition angle setting means responsive to the engine speed signal and an output signal of the basic fuel injection quantity calculating means for setting an ignition angle from a position detected to the first reference crank angle to an ignition position and for generating an ignition angle signal, ignition timing calculating means responsive to the ignition angle signal and the crank angular velocity signal for calculating an ignition timing converted from the ignition angle and the average crank angular velocity and for generating an ignition timing signal, timer means responsive to an output signal of the ignition timing correcting means for operating the fuel injector, and setting means for setting the first reference crank angle and the second reference crank angle to coincide with the average crank angular velocity and an average crank angular velocity from the position detected to the first reference crank angle to the ignition position so as to control with high precision to a set ignition advance value even at a time of transient operational state of the engine.

2. An ignition timing control system for an internal combustion engine with at least one fuel injector, having a cam angle sensor for detecting a specific cam angle and for generating a cam angle signal, a crank angle sensor for detecting a first reference crank angle and a second reference crank angle provided at an advancing side in an ignition timing of the first reference crank angle and for generating crank angle signals corresponding to the first and second reference crank angles, a throttle position sensor for detecting an opening degree of a throttle value of the engine and for generating a throttle position signal corresponding to the opening degree of the throttle valve, crank angular velocity calculating means responsive to the crank angle and cam angle signals for calculating an average crank angular velocity between the first and second reference crank angles detected and for generating a crank angular velocity signal, and engine speed calculating means responsive to the crank angular velocity signal for calculating an engine speed and for generating an engine speed signal, and said system comprises:

- basic fuel injection quantity calculating means responsive to the engine speed signal and the throttle position signal for calculating a basic fuel injection quantity and for generating a quantity signal,
- ignition angle setting means responsive to the engine speed signal and the quantity signal for setting an ignition angle from a position detected to the first reference crank angle to ignition position and for generation an ignition angle signal,
- ignition timing calculating means responsive to the ignition angle signal and the crank angular velocity signal for calculating an ignition timing converted from the ignition angle by the average crank angular velocity,
- ignition timing description correcting quantity setting means responsive to the quantity signal and the engine speed signal for setting a correcting value and for generating a correcting value signal,
- ignition timing correcting means responsive to the correcting value signal for correcting the quantity signal, and
- timer means responsive to an output of the ignition timing correcting means for operating the fuel injector so as to control with high precision to a set ignition advance value even at a time of transient operational state of the engine.

* * * * *